United States Patent [19]
Gatica

[11] Patent Number: 5,895,493
[45] Date of Patent: Apr. 20, 1999

[54] METHOD AND APPARATUS FOR STORAGE OF MULTIPLE HOST STORAGE MANAGEMENT INFORMATION ON A STORAGE SUBSYSTEM

[75] Inventor: Juan C. Gatica, Wichita, Kans.

[73] Assignee: LSI Logic Corporation, Milpitas, Calif.

[21] Appl. No.: 08/884,707

[22] Filed: Jun. 30, 1997

[51] Int. Cl.⁶ .................................................. G06F 13/00
[52] U.S. Cl. ........................... 711/147; 711/141; 707/201; 395/182.04
[58] Field of Search .................... 711/112–159; 395/182; 707/200–203

[56] References Cited

U.S. PATENT DOCUMENTS

| | | | |
|---|---|---|---|
| 4,530,054 | 7/1985 | Hamstra et al. | 364/200 |
| 5,289,588 | 2/1994 | Song et al. | 395/425 |
| 5,390,328 | 2/1995 | Frey et al. | 395/650 |
| 5,452,421 | 9/1995 | Bardsley et al. | 395/182.02 |
| 5,504,861 | 4/1996 | Crockett et al. | 395/182.11 |
| 5,553,287 | 9/1996 | Bailey et al. | 395/650 |
| 5,555,371 | 9/1996 | Duyanovich et al. | 395/182.11 |
| 5,625,841 | 4/1997 | Dawkins et al. | 395/835 |
| 5,644,767 | 7/1997 | Rathunde | 395/651 |
| 5,689,706 | 11/1997 | Rao et al. | 395/617 |
| 5,734,818 | 3/1998 | Kern et al. | 395/182.18 |
| 5,761,660 | 6/1998 | Josten et al. | 707/8 |
| 5,787,459 | 7/1998 | Stallmo et al. | 711/112 |
| 5,790,773 | 8/1998 | DeKoning et al. | 395/182.04 |

*Primary Examiner*—Christopher B. Shin
*Attorney, Agent, or Firm*—Daniel N. Fishman; Wayne P. Bailey

[57] ABSTRACT

Methods and associated apparatus for maintaining management information pertaining to a storage subsystem attached to a plurality of host systems. In particular, the present invention stores configuration and other management information regarding a storage subsystem in a reserved area of the storage subsystem called a host store region (HSR). The configuration information is timestamped by the storage subsystem when stored in the HSR. The information written therein is written and read by attached host systems using standard read and write commands directed specifically to the HSR. The storage subsystem has a reserved area distinct from the storage capacity used for persistent storage of host supplied data. A portion (the HSR) of this reserved area is set aside as a scratchpad for use by all attached host systems to communicate management information among one another. The present invention uses the existing communication channel between each of the attached host systems and the common storage subsystem. Where, for example, the storage subsystem is a RAID storage subsystem attached to the host systems by SCSI interfaces, the SCSI interface is used by each host system to access the HSR thus obviating the need for another communication channel to synchronize all attached host systems. A host system modifying the configuration or state of the storage subsystem writes an appropriate message to the HSR to indicate the management information modification. All host systems periodically poll the HSR to determine the present administrative state and configuration information.

12 Claims, 5 Drawing Sheets

METHOD AND APPARATUS FOR STORAGE OF MULTIPLE HOST STORAGE MANAGEMENT INFORMATION ON A STORAGE SUBSYSTEM

BACKGROUND OF THE INVENTION

1. Field of the Invention

The invention relates to host based storage subsystem management and in particular to a method and associated apparatus for storage of configuration information, shared among a plurality of attached host systems, on a reserved area of a commonly attached storage subsystem.

2. Description of Related Art

It is common in the art relating to storage subsystems that host system programs are, in part, responsible for administration and management of attached storage subsystems. For example, initial configuration of a storage subsystem to allocate available storage capacity to the storage of data may be performed by such a host program. The host program, for example, interacts with an administrative user to determine the desired configuration of the storage space and then transmits any requisite command sequences to the storage subsystem to effectuate the desired configuration. The configuration thereby become known to the host system as well as the attached storage subsystem.

Further, it is known in the art to permit a plurality of host systems to share access to common storage subsystems. In such clustered environments where a plurality of hosts connect to a common storage subsystem, the plurality of hosts communicate their respective configuration and management operations among one another. When a first host system configures, re-configures, or otherwise administers an attached storage subsystem, other host systems attached to that storage subsystem need to be informed of any changes in the configuration or operation of the storage subsystem.

As taught by prior techniques, host systems attached to a common storage subsystem have used a communication channel such as a local area network (LAN) or other communication channel to exchange such administrative messages. Each host system broadcasts messages on the communication channel to other host system to announce the configuration or other administrative operations performed by the broadcasting system. A number of the host systems (frequently all) maintain a store of the current configuration information related to the present state of the storage subsystem. As messages are received from other host systems, each host system updates its model of the present storage subsystem configuration.

These methods and structure taught by prior techniques create a problem for a host system which is newly attached to a common storage subsystem or which is temporarily disconnected from the other host systems. Such a system must seek to synchronize its model of the present state of the storage subsystem by inquiring of one or more of the other systems as to the present status of the storage subsystem. When so inquiring to synchronize status, a host system must determine whether any received status information is more recent than status information already known to the host system.

It is therefore a problem to devise a simple method and associated apparatus to permit a plurality of host systems to maintain synchronization regarding state information pertaining to a commonly attached storage subsystem.

SUMMARY OF THE INVENTION

The present invention solves the above and other problems, thereby advancing the state of the useful arts by providing simple methods and associated apparatus for maintaining status information pertaining to a storage subsystem attached to a plurality of host systems. In particular, the methods of the present invention store configuration information regarding a storage subsystem in a reserved area of the storage subsystem—a host store region (HSR). The configuration information is timestamped when stored in the HSR. The information written therein is written and read by host systems using standard read and write commands directed specifically to the HSR.

More specifically, the storage subsystem has a reserved area distinct from the storage capacity used for persistent storage of host supplied data. A portion of this reserved area is set aside as a scratchpad for use by all attached host systems to communicate configuration information among one another. This feature of the present invention obviates the need for a dedicated communication channel between the host systems used for exchange of configuration and other administrative information. Rather, the present invention uses the existing communication channel between each of the attached host systems and the common storage subsystem.

Where, for example, the storage subsystem is a RAID storage subsystem attached to the host systems by SCSI interfaces (e.g., one or more SCSI parallel busses or SCSI Fibre Channel communication links), the SCSI interface is used by each host system to access the HSR thus obviating the need for another communication channel to synchronize all attached host systems. The HSR is reserved in an area outside the defined storage for all logical units (LUNs) presently defined within the RAID storage subsystem. Preferably, SCSI Read Buffer and Write Buffer commands are used to directly address the reserved area without specification of a LUN. Any time a host system modifies the configuration of the storage subsystem (or otherwise administers its state), an appropriate message is written by the host system to the HSR to indicate the configuration or administrative modification. All host systems periodically poll the HSR to determine the present administrative state and configuration information.

A timestamp value is generated by the host system initiating the administrative changes and the timestamps is appended to the configuration or administrative information written in the HSR. The timestamp value is read with each poll by attached host systems. The timestamp value is then used by the host system to determine if its configuration is more or less recent than the presently stored configuration in the HSR.

It is therefore an object of the present invention to provide methods and associated apparatus for enabling the coordination of administration of a storage subsystem by a plurality of attached host systems.

It is another object of the present invention to provide methods and associated apparatus for enabling the coordination of administration of a storage subsystem by a plurality of attached host systems without the need for a dedicated communication channel between the host systems.

It is still another object of the present invention to provide methods and associated apparatus for enabling the coordination of administration of a storage subsystem by a plurality of attached host systems through use of a shared scratchpad area reserved in the commonly attached storage subsystem.

It is yet another object of the present invention to provide methods and associated apparatus for defining and utilizing a scratchpad area reserved in the storage subsystem to eliminate the need for synchronization of host system storage management application to synchronize their respective configuration models via another communication channel.

The above and other objects, aspects, features, and advantages of the present invention will become apparent from the following description and the attached drawing.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
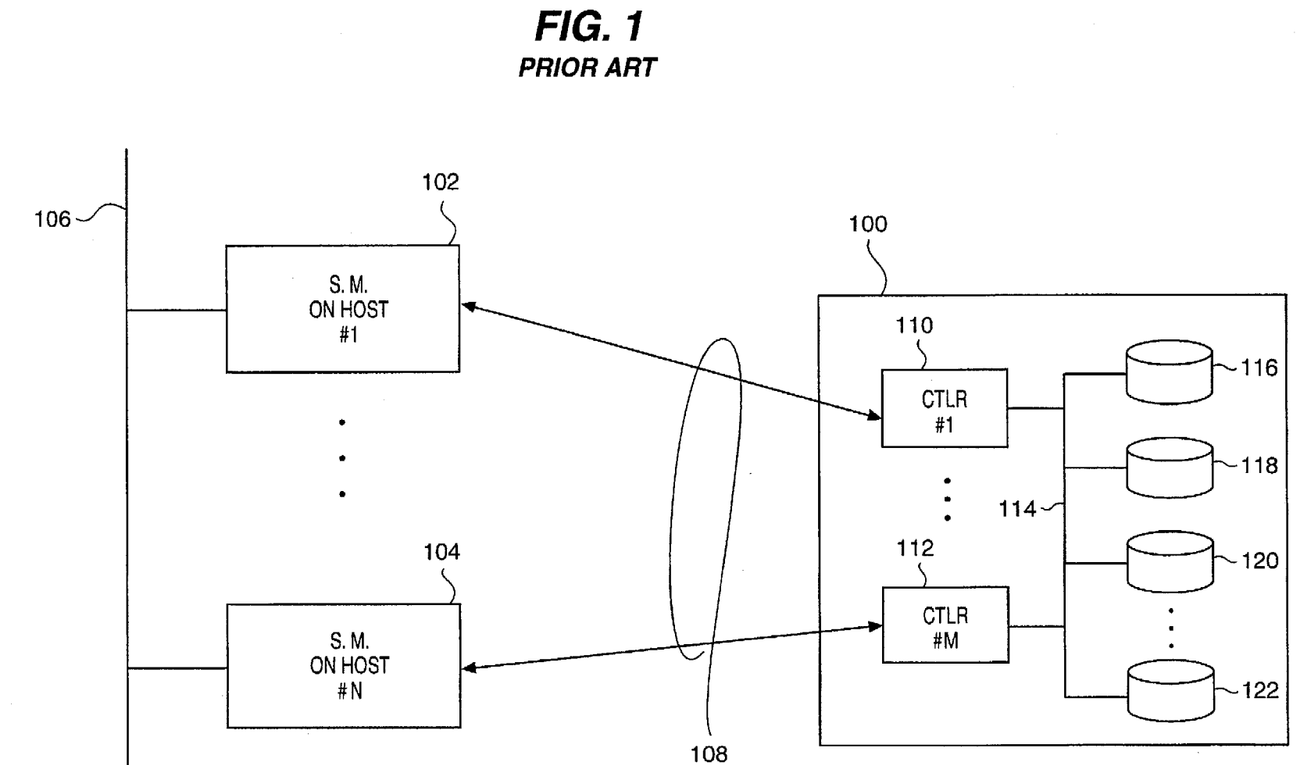
FIG. 1 is a block diagram of a typical prior system as known in the art in which a plurality of host systems are attached to a common storage subsystem but exchange of management synchronization via another communication link.

FIG. 1 is a block diagram of a typical system as known in the art in which a plurality of host systems 102 and 104 are commonly attached to a storage subsystem 100. Host systems store data on, and retrieve data from, storage subsystem 100 via paths 108. As is known in the art, paths 108 may be any of several well known interface busses or communication media including, for example, SCSI, Fibre Channel, SSA, etc. Controllers 110 and 112 within storage subsystem 100 process data read and write requests on behalf of attached host systems 102 and 104. Controllers 110 and 112 exchange information with storage devices (e.g., disk drives 116–122) via path 114. Path 114 may also be implemented using any of several well known interfaces, protocols, and communication media. For example, path 114 may be SCSI, Fibre Channel, SSA, EIDE, IPI, etc.

It is known to operate storage management processes on host systems 102 and 104 to manage the configuration and operation of storage subsystem 100. These processes are indicated by the labels "S.M." in each of host systems 102 and 104 (also referred to herein as SM or SM processes). SM performs various management and configuration tasks required for proper operation of storage subsystem 100. For example, where storage subsystem 100 is a disk array subsystem (e.g., a RAID storage subsystem), SM processes may add, delete, or modify definitions of logical units (LUNs) in the array of disk drives 116–122. Other options in the operation of RAID storage subsystem 100 may be configured by SM processes in host systems 102 such as levels of RAID operation for particular LUNs or redundancy configurations for RAID storage controllers 112 and 14.

As is known in the art in performing such configuration and management tasks, SM processes in host systems 102 and 104 exchange information among one another via path 106. When one host system (e.g., 102 or 104) reconfigures storage subsystem 100 to define a new operating parameter or storage configuration, it must notify other host systems of such a change. Messages are exchanged via path 106 among the various host systems to update all host systems attached to storage subsystem 100. Maintaining synchronization of the present operating state of storage subsystem 100 among the attached host systems requires significant processing. If a new host system is added to the cluster attached to the storage subsystem, the newly added system will require updating to synchronize its initial state model of the storage subsystem with the current state actually configured in the system. Similarly, if a host system is temporarily disconnected from the storage subsystem, it's model of the storage subsystem state may require updating when it initially reconnects to the storage subsystem.

Path 106 may be a dedicated communication path used exclusively for such management communication. Alternatively, path 106 may be a communication path used for various interprocess communication purposes including the management communication messaging discussed herein. Where path 106 is a dedicated communication path used exclusively for storage management communication, path 106 adds complexity and associated costs to the system of FIG. 1. Where path 106 is a general purpose communication path used for purposes including storage management communication, use of path 106 for such purposes may utilize valuable bandwidth on the communication path 106.

Figure 2:
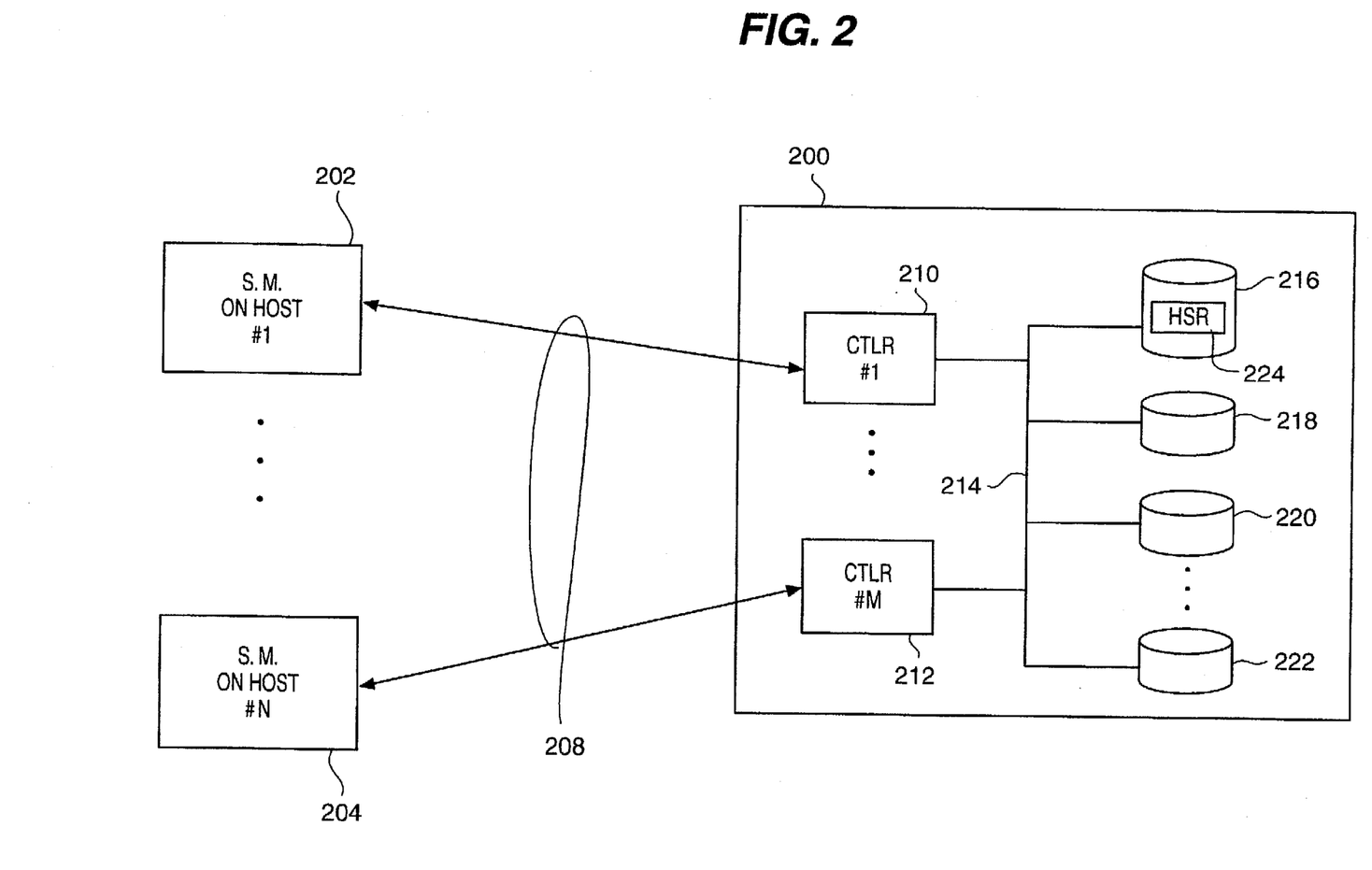
FIG. 2 is a block diagram of a system in accordance with the present invention in which the methods of the present invention are operable to enable exchange of management information by attached host systems via a shared, reserved scratchpad area in the storage subsystem.

FIG. 2 is a block diagram of a system operable in accordance with the present invention. A plurality of host systems 202 and 204 are commonly attached to a storage subsystem 200. Host systems store data on, and retrieve data from, storage subsystem 200 via paths 208. As is known in the art, paths 208 may be any of several well known interface busses or communication media including, for example, SCSI, Fibre Channel, SSA, etc. Controllers 210 and 212 within storage subsystem 200 process data read and write requests on behalf of attached host systems 202 and 204. Controllers 210 and 212 exchange information with storage devices (e.g., disk drives 216–222) via path 214. Path 214 may also be implemented using any of several well known interfaces, protocols, and communication media. For example, path 214 may be SCSI, Fibre Channel, SSA, EIDE, IPI, etc.

As above with regard to FIG. 1, SM processes are operable on host systems 202 and 204 to jointly administer the operation and configuration of storage subsystem 200. However, unlike the system depicted in FIG. 1, host systems 202 and 204 of FIG. 2 do not rely upon a general purpose communication path or a dedicated communication path to exchange information regarding the present configuration of the storage subsystem. Rather, host systems 202 and 204 of FIG. 2 store and retrieve information regarding present configuration and state of storage subsystem 200 on the storage devices (216–222) thereof.

Specifically, host systems 202 and 204 store configuration information on host storage region 224 (HSR). When one host system (e.g., 202 or 204) reconfigures storage subsystem 200 to define a new operating parameter or storage configuration, other host systems must note the change. Each host system maintains its own copy of the management and configuration information it believes represents the present configuration of the storage subsystem 200. The host system performing the configuration or other administrative operation sends a specially encoded write command to the storage subsystem along with the new configuration data to be written to the HSR. The information so written to HSR 224 is then available for reading by other SM processes operating on other host systems. SM processes operable on the multiple host systems therefore communicate by use of HSR 224 as a "scratchpad" area. Each system writes to the scratchpad to note changes requested in the configuration or operation of the storage subsystem 200.

The information written to, and read from, HSR 224 and as stored locally within each host system includes a timestamp value indicating the time of creation of the corresponding configuration or operation modifications. Periodically, each of the host systems (e.g., 202 and 204) reads (or polls) the information stored in the HSR 224. In particular, the timestamp value recorded in the HSR 224 is inspected to determine if the stored management information in the HSR 224 is newer than the management and configuration information stored locally within the polling host system. Specifically, each host system compares the timestamp value read from HSR 224 with its locally stored timestamp value. If the management information stored in HSR 224 is newer, as indicated by its timestamp value, the polling host system reads the management information stored in HSR 224 to update its locally stored copy (as well as its locally stored timestamp value). Additional detail of the methods of the present invention are presented below with respect to FIGS. 3–5B.

Figure 3:
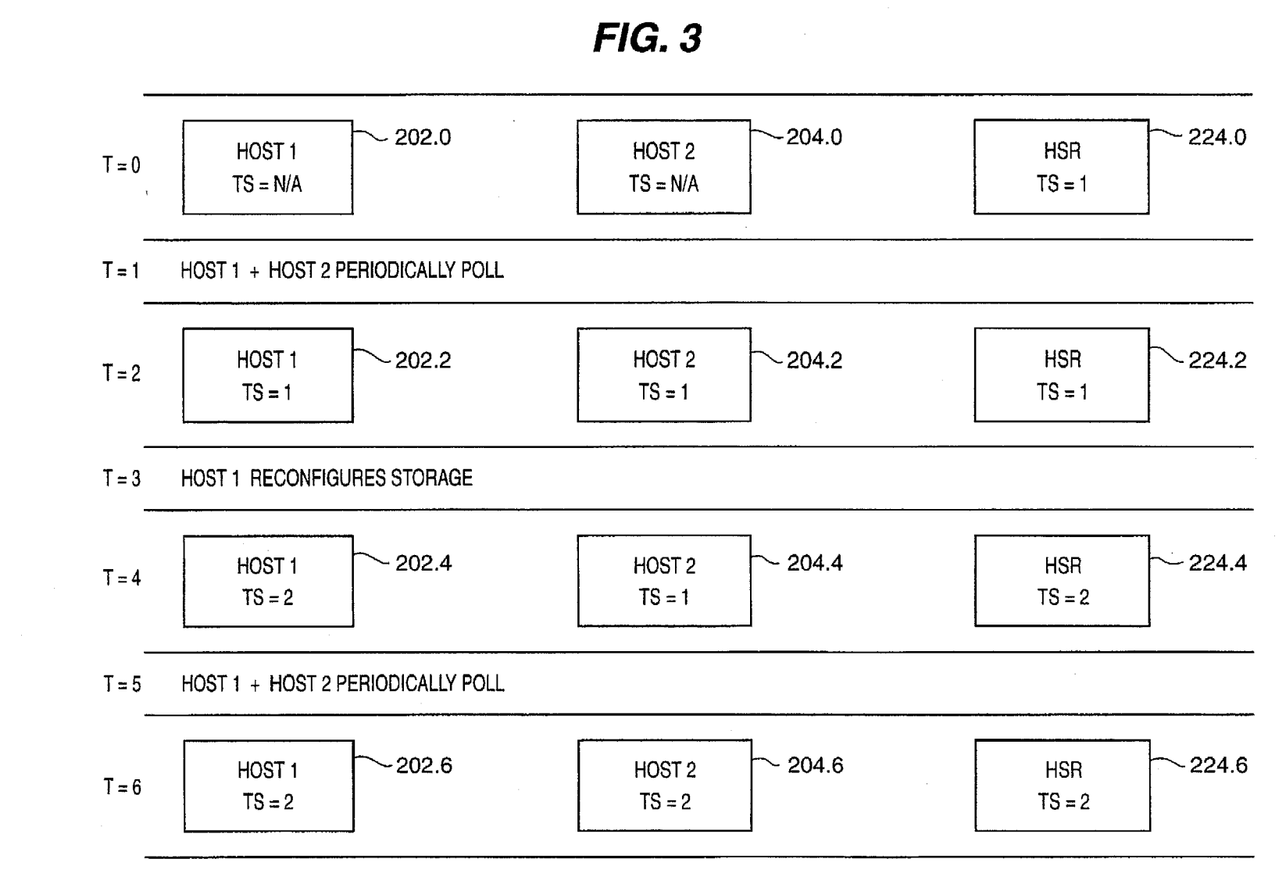
FIG. 3 is a block diagram describing a typical sequence of exchange of management information among a plurality of attached host systems sharing a scratchpad area reserved in the storage subsystem.

FIG. 3 is a diagram depicting a typical sequence of events updating management and configuration information for a storage subsystem and the timestamp values associated therewith. In FIG. 3 horizontal lines separate distinct, exemplary states in chronological order. Each state is identified by a time label "T" ranging from 0 through 6. At each state, an action is described or the state of each of two exemplary host systems 202 and 204 is presented. The state of host system 202 at time T=x is shown in a box labeled 202.x. Likewise, the state of host system 204 and HSR 224 are presented as 204.x and 224.x. The state of each box is signified by the value of its locally stored timestamp value TS. The value of TS indicates the version (timestamp) of management information stored within the respective element.

At T=0, host system 202.0 and host system 204.0 have an undefined (initial) timestamp value stored within (namely TS=n/a). HSR 224.0 has an initially defined management information version indicated by TS=1. At state T=1, host systems 202.0 and 204.0 perform their respective periodic poll of HSR 224.0. In so doing, both host systems 202.0 and 204.0 update their respective, locally stored copies of management information as indicated by the timestamp values TS=1 in 202.2, 204.2 and 224.2 at state T=2. At state T=3, host system 202.2 reconfigures or otherwise alters the management information related to the storage subsystem. The result of this update at state T=4 reflects host system 202.4 and HSR 224.4 storing management information corresponding to timestamp TS=2. Host system 204.4 has yet to detect the change made by operation of host system 202.4. At state T=5, host systems 202.4 and 204.4 again poll the storage subsystem HSR 224.4 to determine the present state of operation. Finally, at state T=6, host systems 202.6 and 204.6 and HSR 224.6 are all synchronized by host 204.4 updating its locally stored management information from the more recent version found in its last poll of HSR 224.4 at state T=5.

Figure 4A:
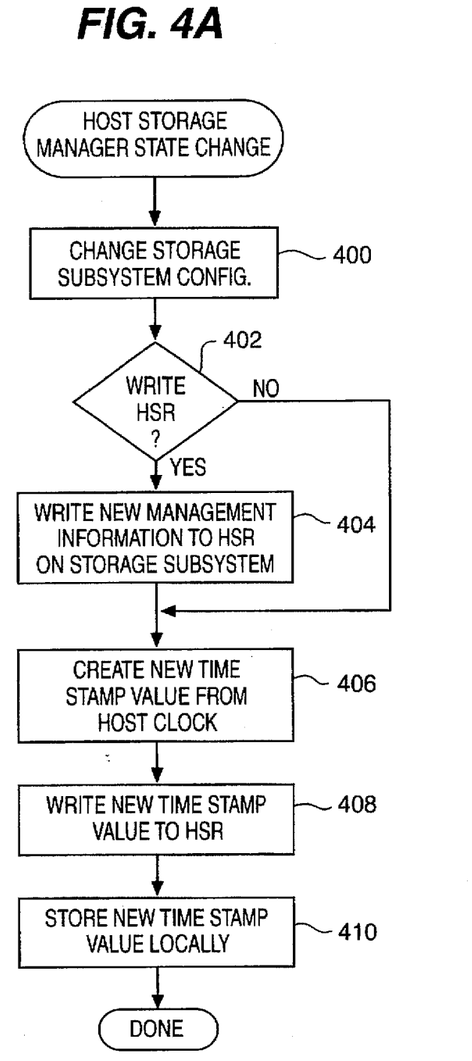
FIGS. 4A and 4B are flowcharts describing the methods of the present invention operable within attached host systems and the storage subsystem to write management information changes to the shared scratchpad area of the storage subsystem.

FIGS. 4A–5B are flowcharts describing the operation of the methods of the present invention. FIG. 4A describes the operation of the methods of the present invention within an attached host system to generate a change of state in the configuration or operation of the storage subsystem. Element 400 is first operable to effectuate the desired change in the storage subsystem configuration or operation by appropriate commands exchanged with the storage subsystem. Element 402 is then operable to determine whether the particular change requires that new management data be written to the HSR of the storage subsystem. In the preferred mode of the invention, there are a number of modification which need not be specifically stored in the HSR. Such changes are stored in standard and/or vendor specific locations of the storage subsystem controller(s) in accordance with the standards of the protocols in use. For example, in SCSI interface connections between the host systems and the storage subsystem, creation, deletion, and formatting of a LUN need not be stored in the HSR. Rather, such information is maintained in standard locations (or vendor specific locations) in the SCSI command and sense pages.

If element 402 determines that the specific management data need not be written to the HSR, processing continues at element 406 below. Though there may be no need to write the management data per se, an updated timestamp is required in order to notify other host systems of the potential configuration update required of them. I element 402 determines that data need be written to the HSR, element 404 is next operable to write appropriate management information in the HSR of the storage subsystem. As noted above, the HSR is allocated in a reserved area of the storage space of the subsystem. This reserved area is outside of the space allocable to the storage of user related data. For example, under RAID storage management control, the reserved space in which the HSR resides is never allocated for LUN storage space. In view of this allocation, write and read commands directed specifically to the HSR are used to bypass the defined storage areas for user data (e.g., the RAID LUNs). Specifically, in the preferred embodiment, SCSI Read Buffer and Write Buffer commands are used to access information in the HSR.

Element 406 is then operable to create a new timestamp value from the host system's clock. In the preferred embodiment, the system clock of each host system generating a configuration or administrative change is used to create an associated timestamp value. In a clustered environment, it is common that all host systems have their respective clocks reasonably synchronized to one another. An alternative embodiment permits the storage subsystem to provide the clock for the timestamp generation. Such an alternative embodiment obviates the need to maintain synchronization among a plurality of host system clocks. However, such synchronization is typically provided as a standard feature in a clustered computing environment. Clocks useful for timestamp creation are not as common within the standard control features of many storage subsystems. In general, location for creation of the timestamp values and the associated clock devices is a design choice which may vary in accordance with specific parameters of a particular application.

Element 408 is next operable to write the newly created timestamp value to the HSR. Finally, element 410 is operable to store the newly created timestamp value locally in the host system. The host system has thereby completed processing for the desired configuration or administrative changes and has updated the timestamp value in the HSR in order to notify other host systems upon their next polling sequence (discussed below).

Figure 4B:
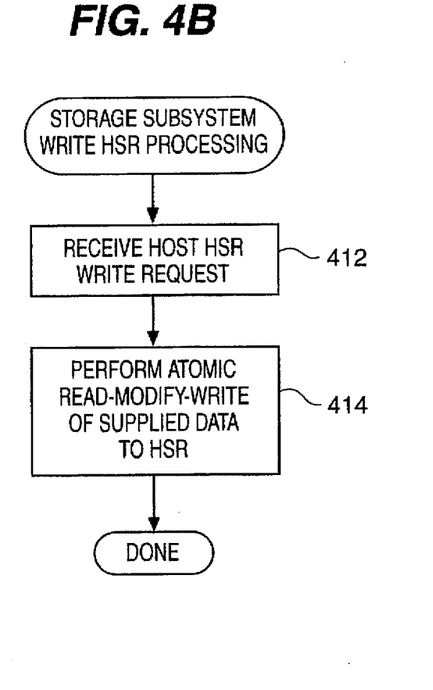

Elements 412 and 414 of FIG. 4B are operable within the storage subsystem in cooperation with elements 400–410 in the host system. Element 412 is operable to receive the host system's new management data destined for storage in the HSR. The controller of the storage subsystem then performs an atomic "read-modify-write" process on the HSR to help assure the integrity of the update operation. The host systems "serialize" the write requests to the HSR by providing a length and address for each field to be updated in the HSR. This permits each field to be updated in an atomic operation which excludes interference from competing update requests. Well known multiprogramming techniques may be employed to further enhance the reliability of update sequences. For example, locking semaphore features may be used to preclude nearly simultaneous update requests from two different hosts. Given the relatively low probability of such an occurrence in view of the low frequency of such updates, such precautions likely provide little benefit as compared to their complexity.

Figure 5A:
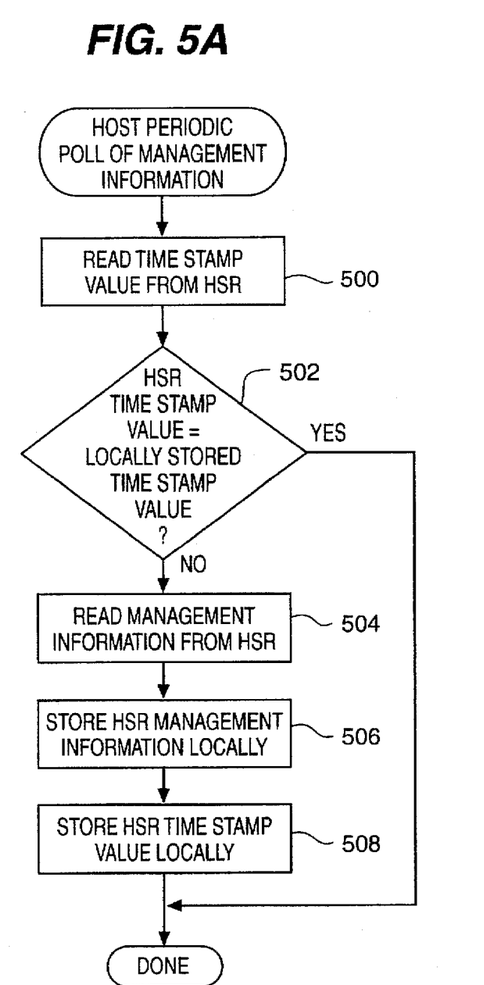
FIGS. 5A and 5B are flowcharts describing the methods of the present invention operable within attached host systems and the storage subsystem to periodically poll for management information changes from the shared scratchpad area of the storage subsystem.
Figure 5B:
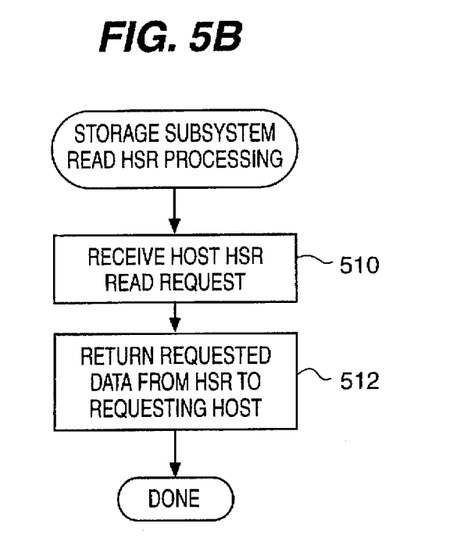

FIGS. 5A and 5B describe the operation of a polling sequence performed within the host systems in cooperation with the storage subsystem controller(s) to determine if an update of the locally stored management information is required. Element 500 of FIG. 5A is first operable within a host system to initiate a periodic poll by reading the timestamp value from the HSR of the storage subsystem. As noted above, a SCSI Read Buffer command is preferred for access to the reserved storage area in which the HSR resides. Element 502 next compare the returned timestamp from the HSR with the locally stored timestamp value. If the two values are equal, then the locally stored management information is synchronized with the current information stored in the HSR of the storage subsystem. Processing is then completed until a next periodic poll is initiated.

If element 502 determines that the HSR and local timestamp values are not equal, the management information stored on the HSR of the storage subsystem is presumed to be more recent than that which is locally stored. Processing continues with element 504 below. As noted above, strict synchronization of the host system clocks is not required for operation of the methods of the present invention. The fact that the timestamp value is different than the locally stored value is sufficient grounds for determining that the locally stored management information is outdated by updated information in the HSR. It matters not that the HSR timestamp value is slightly larger or smaller than the locally stored timestamp value. In either case, the locally stored value and associated management information has been superceded by an update generated by another host system (one whose clock may be somewhat out of sync with the polling system's clock).

Element 504 is next operable to read the updated management information from the HSR, preferably using a SCSI Read Buffer command as noted above. The returned management data is then copied over the locally stored management data by operation of element 506 and the HSR's timestamp value overwrites the locally stored timestamp value to thereby complete processing of the present polling sequence. Processing begins anew with the initiation of the next periodic poll.

FIG. 5B describes the processing within the controller(s) of the storage subsystem in cooperation with the processing of FIG. 5A above. Element 510 is operable to receive the Read Buffer command from an attached host computer. Element 512 then returns the requested data from the HSR to the requesting host system.

Those skilled in the art will note that the controller(s) in the storage subsystem are ignorant of the semantic of the management information stored in the HSR. The semantic is completely defined by the cooperative operation of the multiple host systems. The controller(s) of the storage subsystem merely record the data provided by received write requests (e.g., timestamp value or management data provided by Write Buffer commands) and return data requested by the host systems (e.g., timestamp value or management data previously stored and requested by Read Buffer commands).

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a system including a plurality of host systems attached to a common storage subsystem, an apparatus for maintaining synchronization of storage subsystem management information among said plurality of host systems comprising:

means for reserving a host storage region in said storage subsystem for storage of said management information;

writing means for writing a message from one of said plurality of host systems to said host storage region in response to changes in said management information initiated by said one of said plurality of host systems; and polling means for periodically polling said host storage region by said plurality of host systems to determine whether said management information in said host storage region is updated.

2. The apparatus of claim 1 further comprising:

means, responsive to said writing means, for generating a timestamp value associated with said message; and means for storing said timestamp value associated with said message within said host storage region of said storage subsystem.

3. The apparatus of claim 2 further comprising:

means, responsive to said writing means, for storing said timestamp value associated with said message within said one of said host systems.

4. The apparatus of claim 3 wherein said means for periodically polling further comprises:

means for retrieving a current timestamp from said host storage region to at least one of said plurality of host systems;

means for comparing said current timestamp value with said timestamp value stored in said at least one of said plurality of host systems to determine that the management information stored in said host storage region associated with said current timestamp value is newer than management information previously known to said at least one of said plurality of host systems and associated with said timestamp value; and means for updating management information in said at least one of said plurality of host systems in response to the determination that the retrieved management information is newer than management information previously known to said at least one of said plurality of host systems.

5. In a system including a plurality of host systems attached to a common storage subsystem, a method for maintaining synchronization of storage subsystem management information among said plurality of host systems comprising the steps of:

reserving a host storage region in said storage subsystem for storage of said management information;

writing a message from one of said plurality of host systems to said host storage region in response to changes in said management information initiated by said one of said plurality of host systems; and periodically polling said host storage region by said plurality of host systems to determine whether said management information in said host storage region is updated.

6. The method of claim 5 further comprising the steps of:

generating a timestamp value associated with said message in response to said writing step; and storing said timestamp value associated with said message within said host storage region of said storage subsystem.

7. The method of claim 6 further comprising the step of:

storing said timestamp value associated with said message within said one of said host systems in response to said writing step.

8. The method of claim 7 wherein the step of periodically polling further comprises the steps of:

retrieving a current timestamp from said host storage region to at least one of said plurality of host systems;

comparing said current timestamp value with said timestamp value stored in said at least one of said plurality of host systems to determine that the management information stored in said host storage region associated with said current timestamp value is newer than management information previously known to said at least one of said plurality of host systems and associated with said timestamp value; and updating management information in said at least one of said plurality of host systems in response to the determination that the retrieved management information is newer than management information previously known to said at least one of said plurality of host systems.

9. A computer readable storage medium tangibly embodying programmed instructions for performing a method for maintaining synchronization of storage subsystem management information among a plurality of host systems attached to a storage subsystem, the method comprising the steps of:

reserving a host storage region in said storage subsystem for storage of said management information;

writing a message from one of said plurality of host systems to said host storage region in response to changes in said management information initiated by said one of said plurality of host systems; and periodically polling said host storage region by said plurality of host systems to determine whether said management information in said host storage region is updated.

10. The storage medium of claim 9 wherein the method further comprises the steps of:

generating a timestamp value associated with said message in response to said writing step; and storing said timestamp value associated with said message within said host storage region of said storage subsystem.

11. The storage medium of claim 10 wherein the method further comprises the step of:

storing said timestamp value associated with said message within said one of said host systems in response to said writing step.

12. The storage medium of claim 11 wherein the method step of periodically polling further comprises the steps of:

retrieving a current timestamp from said host storage region to at least one of said plurality of host systems;

comparing said current timestamp value with said timestamp value stored in said at least one of said plurality of host systems to determine that the management information stored in said host storage region associated with said current timestamp value is newer than management information previously known to said at least one of said plurality of host systems and associated with said timestamp value; and updating management information in said at least one of said plurality of host systems in response to the determination that the retrieved management information is newer than management information previously known to said at least one of said plurality of host systems.

* * * * *